US008721315B2

United States Patent
Maki et al.

(10) Patent No.: US 8,721,315 B2
(45) Date of Patent: May 13, 2014

(54) METHOD OF HANDLING LIQUID TO PREVENT MACHINE CONTAMINATION DURING FILLING

(75) Inventors: Kirk Edward Maki, Tecumseh, MI (US); George David Lisch, Jackson, MI (US)

(73) Assignee: Amcor Limited, Hawthorn (AU)

( * ) Notice: Subject to any disclaimer, the term of this patent is extended or adjusted under 35 U.S.C. 154(b) by 169 days.

(21) Appl. No.: 13/230,164

(22) Filed: Sep. 12, 2011

(65) Prior Publication Data

US 2012/0064189 A1 Mar. 15, 2012

Related U.S. Application Data

(60) Provisional application No. 61/382,138, filed on Sep. 13, 2010.

(51) Int. Cl.
*B29C 49/48* (2006.01)
*B29C 49/62* (2006.01)

(52) U.S. Cl.
USPC ............ 425/215; 425/225; 425/522; 425/524

(58) Field of Classification Search
USPC .................. 425/215, 225, 522, 524; 264/524
See application file for complete search history.

(56) References Cited

U.S. PATENT DOCUMENTS

| | | | | |
|---|---|---|---|---|
| 808,479 A | * | 12/1905 | Riddle | 264/326 |
| 1,276,592 A | * | 8/1918 | Swinehart | 425/34.1 |
| 1,525,126 A | * | 2/1925 | Goldstein | 249/141 |
| 1,939,917 A | * | 12/1933 | Patterson | 65/229 |
| 2,349,177 A | * | 5/1944 | Kopitke | 264/524 |
| 2,485,836 A | * | 10/1949 | MacConnell, Jr. | 65/356 |
| 3,267,185 A | | 8/1966 | Freeman, Jr. | |
| 3,268,635 A | | 8/1966 | Kraus et al. | |
| 3,398,427 A | * | 8/1968 | John | 425/149 |
| 3,608,015 A | * | 9/1971 | Martelli | 264/526 |
| 3,907,245 A | * | 9/1975 | Linder | 249/94 |
| 3,911,071 A | * | 10/1975 | Naumann | 264/524 |

(Continued)

FOREIGN PATENT DOCUMENTS

| | | |
|---|---|---|
| EP | 0849514 | 6/1998 |
| EP | 1529620 | 5/2005 |

(Continued)

OTHER PUBLICATIONS

Partial machine translation of JP-2006346989 a dated Dec. 28, 2006 obtained from the JPO website.*

(Continued)

*Primary Examiner* — Robert B Davis
(74) *Attorney, Agent, or Firm* — Harness, Dickey & Pierce, P.L.C.

(57) ABSTRACT

A mold device for injecting a fluid into a container where the mold device comprises a first mold portion having a first mating surface and a second mold portion having a second mating surface. The second mating surface is shaped complementary to the first mating surface. A mold cavity is disposed within the first mold portion and the second mold portion. The mold device further comprises an interlocking mating surface system disposed between or made a part of the first mold portion and second mold portion to define a fluid seal therebetween and align the first mold portion to the second mold portion in at least a first direction.

22 Claims, 2 Drawing Sheets

(56) References Cited

U.S. PATENT DOCUMENTS

| | | | |
|---|---|---|---|
| 3,993,427 A | 11/1976 | Kauffman et al. | |
| 4,039,641 A | 8/1977 | Collins | |
| 4,099,280 A * | 7/1978 | Hoppe et al. | 264/101 |
| 4,120,924 A * | 10/1978 | Rainville | 264/45.5 |
| 4,177,239 A | 12/1979 | Gittner et al. | |
| 4,321,938 A | 3/1982 | Siller | |
| 4,432,720 A | 2/1984 | Wiatt et al. | |
| 4,457,688 A | 7/1984 | Calvert et al. | |
| 4,490,327 A | 12/1984 | Calvert et al. | |
| 4,499,045 A | 2/1985 | Obsomer | |
| 4,539,172 A | 9/1985 | Winchell et al. | |
| 4,595,449 A * | 6/1986 | Nowicki | 156/444 |
| 4,725,464 A | 2/1988 | Collette | |
| 4,883,631 A | 11/1989 | Ajmera | |
| 4,935,190 A | 6/1990 | Tennerstedt | |
| 5,129,815 A | 7/1992 | Miyazawa et al. | |
| 5,269,672 A | 12/1993 | DiGangi, Jr. | |
| 5,389,332 A | 2/1995 | Amari et al. | |
| 5,403,538 A | 4/1995 | Maeda | |
| 5,540,879 A | 7/1996 | Orimoto et al. | |
| 5,599,496 A | 2/1997 | Krishnakumar et al. | |
| 5,622,735 A | 4/1997 | Krishnakumar et al. | |
| 5,635,226 A | 6/1997 | Koda et al. | |
| 5,687,550 A | 11/1997 | Hansen et al. | |
| 5,824,237 A | 10/1998 | Stumpf et al. | |
| 5,962,039 A | 10/1999 | Katou et al. | |
| 6,214,282 B1 | 4/2001 | Katou et al. | |
| 6,277,321 B1 | 8/2001 | Vailliencourt et al. | |
| 6,485,670 B1 | 11/2002 | Boyd et al. | |
| 6,502,369 B1 | 1/2003 | Andison et al. | |
| 6,692,684 B1 | 2/2004 | Nantin et al. | |
| 6,729,868 B1 | 5/2004 | Vogel et al. | |
| 6,749,415 B2 | 6/2004 | Boyd et al. | |
| 6,767,197 B2 | 7/2004 | Boyd et al. | |
| 7,141,190 B2 | 11/2006 | Hekal | |
| 7,473,388 B2 | 1/2009 | Desanaux et al. | |
| 7,553,441 B2 | 6/2009 | Shi | |
| 7,914,726 B2 | 3/2011 | Andison et al. | |
| 7,981,356 B2 | 7/2011 | Warner et al. | |
| 8,017,064 B2 | 9/2011 | Andison et al. | |
| 8,096,483 B2 | 1/2012 | Riney | |
| 2001/0010145 A1 | 8/2001 | Tawa et al. | |
| 2005/0067002 A1 | 3/2005 | Jones | |
| 2005/0206045 A1 | 9/2005 | Desanaux et al. | |
| 2006/0097417 A1 | 5/2006 | Emmer | |
| 2006/0231646 A1 | 10/2006 | Geary, Jr. | |
| 2006/0255513 A1* | 11/2006 | Goss | 425/525 |
| 2008/0254160 A1 | 10/2008 | Rousseau et al. | |
| 2008/0271812 A1 | 11/2008 | Stefanello et al. | |
| 2010/0084493 A1 | 4/2010 | Troudt | |
| 2010/0213629 A1 | 8/2010 | Adriansens | |
| 2010/0303946 A1 | 12/2010 | Voth | |
| 2011/0265433 A1 | 11/2011 | Chauvin et al. | |

FOREIGN PATENT DOCUMENTS

| | | | |
|---|---|---|---|
| EP | 1577258 | | 9/2005 |
| EP | 1688234 | | 8/2006 |
| FR | 2887525 | | 12/2006 |
| JP | 57123027 | | 7/1982 |
| JP | 63-249616 | | 10/1988 |
| JP | 02022030 A | * | 1/1990 |
| JP | 09057834 | | 3/1997 |
| JP | 09099477 | | 4/1997 |
| JP | 10-217258 | | 8/1998 |
| JP | 2000-043129 | | 2/2000 |
| JP | 2005-254704 | | 9/2005 |
| JP | 2005-529002 | | 9/2005 |
| JP | 2006346989 A | * | 12/2006 |
| KR | 10-0147442 | | 8/1998 |
| KR | 2006-0105883 | | 10/2006 |
| KR | 10-2006-0128062 | | 12/2006 |
| WO | WO02/24435 | | 3/2002 |
| WO | WO03/095179 | | 11/2003 |
| WO | WO2004/065105 | | 8/2004 |
| WO | WO2005/044540 | | 5/2005 |
| WO | WO2007/120807 | | 10/2007 |

OTHER PUBLICATIONS

International Search Report and Written Opinion dated Apr. 17, 2012 in corresponding PCT International Patent Application No. PCT/US2011/051284 (nine pages).

International Search Report and Written Opinion dated Apr. 18, 2012 in corresponding PCT International Patent Application No. PCT/US2011/051289 (nine pages).

International Search Report and Written Opinion dated May 8, 2012 in corresponding International Patent Application No. PCT/US2011/054584 (six pages).

International Search Report and Written Opinion dated May 9, 2012 in corresponding International Patent Application No. PCT/US2011/056053 (six pages).

International Search Report and Written Opinion dated May 30, 2012 in corresponding International Patent Application No. PCT/US2011/056057 (six pages).

International Search Report and Written Opinion dated Jun. 15, 2012 in corresponding International Patent Application No. PCT/US2011/051293 (eight pages).

International Search Report and Written Opinion dated Sep. 28, 2012 in corresponding International Patent Application No. PCT/US2012/024954 (six pages).

International Search Report and Written Opinion dated Oct. 29, 2012 in corresponding International Patent Application No. PCT/US2012/024950 (seven pages).

* cited by examiner

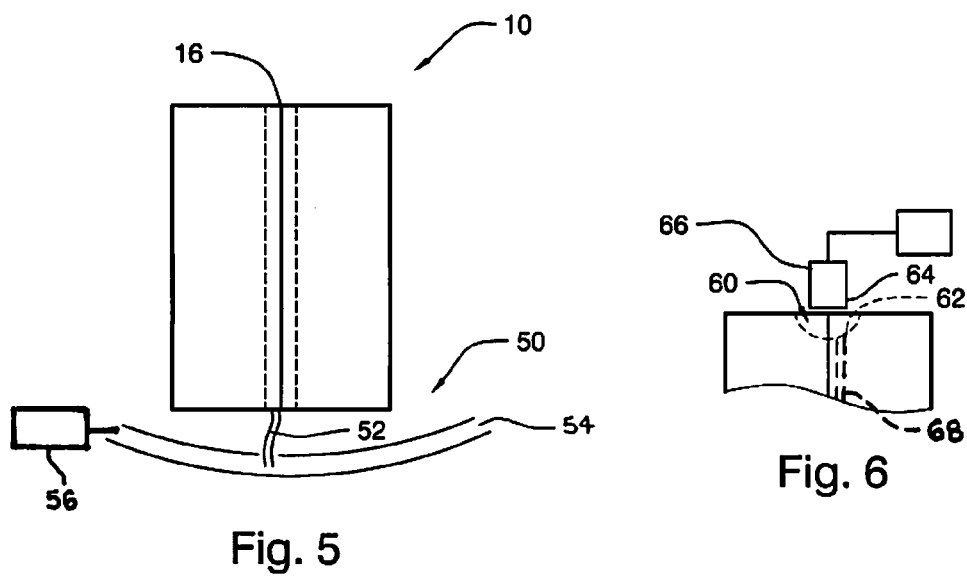
Fig. 5
Fig. 6
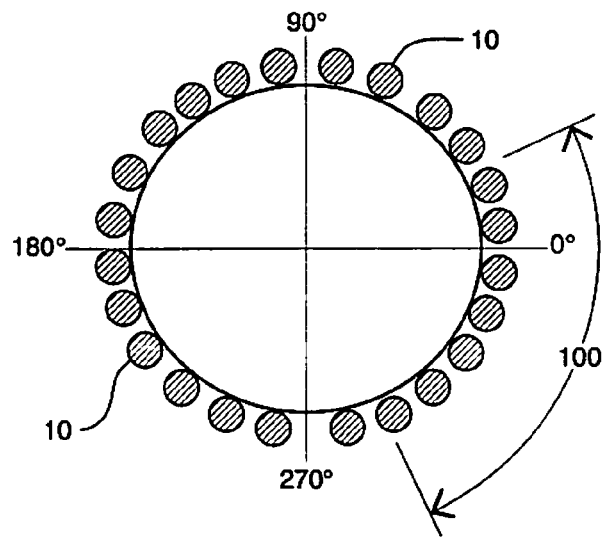
Fig. 7

METHOD OF HANDLING LIQUID TO PREVENT MACHINE CONTAMINATION DURING FILLING

CROSS-REFERENCE TO RELATED APPLICATIONS

This application claims the benefit of U.S. Provisional Application No. 61/382,138, filed on Sep. 13, 2010. The entire disclosure of the above application is incorporated herein by reference.

FIELD

This disclosure generally relates to molds for filling containers with a commodity, such as a liquid commodity. More specifically, this disclosure relates to molds for filling blown polyethylene terephthalate (PET) containers and methods of using the same to minimize machine contaminations during filling.

BACKGROUND

This section provides background information related to the present disclosure which is not necessarily prior art.

As a result of environmental and other concerns, plastic containers, more specifically polyester and even more specifically polyethylene terephthalate (PET) containers are now being used more than ever to package numerous commodities previously supplied in glass containers. Manufacturers and fillers, as well as consumers, have recognized that PET containers are lightweight, inexpensive, recyclable and manufacturable in large quantities.

Blow-molded plastic containers have become commonplace in packaging numerous commodities. PET is a crystallizable polymer, meaning that it is available in an amorphous form or a semi-crystalline form. The ability of a PET container to maintain its material integrity relates to the percentage of the PET container in crystalline form, also known as the "crystallinity" of the PET container. The following equation defines the percentage of crystallinity as a volume fraction:

$$\% \text{ Crystallinity} = \left(\frac{\rho - \rho_a}{\rho_c - \rho_a}\right) \times 100$$

where $\rho$ is the density of the PET material; $\rho_a$ is the density of pure amorphous PET material (1.333 g/cc); and $\rho_c$ is the density of pure crystalline material (1.455 g/cc).

Container manufacturers use mechanical processing and thermal processing to increase the PET polymer crystallinity of a container. Mechanical processing involves orienting the amorphous material to achieve strain hardening. This processing commonly involves stretching an injection molded PET preform along a longitudinal axis and expanding the PET preform along a transverse or radial axis to form a PET container. The combination promotes what manufacturers define as biaxial orientation of the molecular structure in the container. Manufacturers of PET containers currently use mechanical processing to produce PET containers having approximately 20% crystallinity in the container's sidewall.

Thermal processing involves heating the material (either amorphous or semi-crystalline) to promote crystal growth. On amorphous material, thermal processing of PET material results in a spherulitic morphology that interferes with the transmission of light. In other words, the resulting crystalline material is opaque, and thus, generally undesirable. Used after mechanical processing, however, thermal processing results in higher crystallinity and excellent clarity for those portions of the container having biaxial molecular orientation. The thermal processing of an oriented PET container, which is known as heat setting, typically includes blow molding a PET preform against a mold heated to a temperature of approximately 250° F.-350° F. (approximately 121° C.-177° C.), and holding the blown container against the heated mold for approximately two (2) to five (5) seconds. Manufacturers of PET juice bottles, which must be hot-filled at approximately 185° F. (85° C.), currently use heat setting to produce PET bottles having an overall crystallinity in the range of approximately 25%-35%.

SUMMARY

This section provides a general summary of the disclosure, and is not a comprehensive disclosure of its full scope or all of its features.

According to the principles of the present disclosure, a mold device for injecting a fluid into a container is provided. The mold device comprises a first mold portion having a first mating surface and a second mold portion having a second mating surface. The second mating surface is shaped complementary to the first mating surface to defining a sealing engagement therebetween and a mold cavity disposed within the first mold portion and the second mold portion. The mold device further comprises an interlocking mating surface system disposed between or made a part of the first mold portion and second mold portion to define a fluid seal therebetween and align the first mold portion to the second mold portion in at least a first direction.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 5 is a side view of a mold device for the manufacturing and/or filling of a plastic container according to the principles of the present teachings;

FIG. 6 is a side view, with portions in phantom, of a filling nozzle and mold device according to the principles of the present teachings; and FIG. 7 is a schematic view of a manufacturing system according to the present teachings.

Corresponding reference numerals indicate corresponding parts throughout the several views of the drawings.

DETAILED DESCRIPTION

Figure 1:
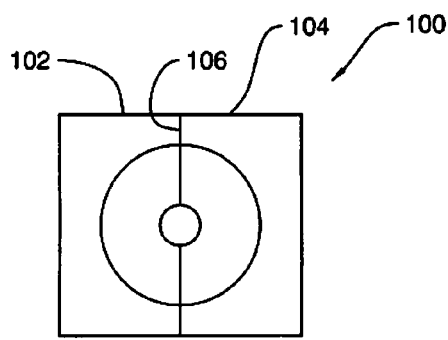
FIG. 1 is a top view of a conventional mold device for the manufacturing and/or filling of a plastic container.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The present teachings provide for a mold device and method of using the same for filling and/or manufacturing containers. The mold design of the present teachings, unlike conventional molds, provides increased fluid (i.e. water, liquid commodity, air, etc.) containment in the event of container failure, rupture, runoff, washdown, and/or spillage.

As will be discussed in greater detail herein, the shape of the mold of the present teachings can be formed according to any one of a number of variations. By way of non-limiting example, the mold of the present disclosure can be configured to hold any one or more of a plurality of containers and be used in connection with a number of fluids and commodities, such as beverages, food, hot-fill type materials, cold fill materials, aseptic, carbonated, or just air.

It should be appreciated that the size and the exact shape of the mold are dependent on the size of the container and the required operational parameters. Therefore, it should be recognized that variations can exist in the presently described designs. According to some embodiments, it should also be recognized that the mold can comprise various features for use with containers having vacuum absorbing features or regions, such as panels, ribs, slots, depressions, and the like, and various pressure devices.

As illustrated in the several figures, the present teachings provide an improved mold design, and method of using the same, that minimizes contamination caused within the mold or other manufacturing/filling machine in the event water, sterilization fluid, and/or product fill sprays out of or otherwise leaks during a container filling process.

As illustrated in FIG. 1, conventional mold designs 100 comprise a pair of mold halves or mold portions 102, 104 that are movably spaced from one another. Each of the mold halves 102, 104 can comprise an internal mold contour (not shown) for holding, conforming, or otherwise following a shape of the container to be formed or filled. Mold halves 102, 104 can be positioned together such that a parting line 106 is formed extending along the mating face or surface between mold halves 102, 104. Traditionally, this parting line 106 is a flat, and generally uniform, planar mating surface or seam. The parting line 106 can include, however, an orifice or aperture for permitting the water or product fill to be introduced or injected into the container (not shown).

However, it has been found that in operation, conventional mold designs 100 suffer from the disadvantage of becoming contaminated in the event of blowout or leaking during the filling process. This can occur due to failure of the container, the filling connection, or one of a number of other critical factors. When a blowout or leak occurs, water or product can fill at least a portion of the mold and other surrounding machinery. In many applications, where sanitation is desired and/or required, this can lead to substantial downtime as the equipment must be torn down and cleaned. Such downtime can lead to reduced production and increased delays.

Figure 2:
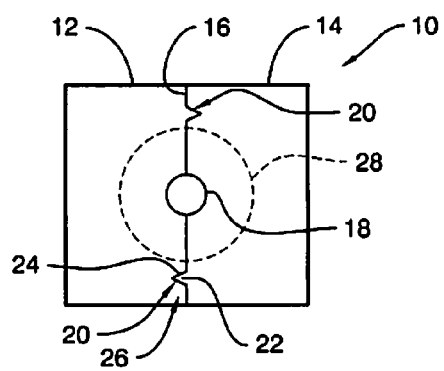
FIG. 2 is a top view of a mold device for the manufacturing and/or filling of a plastic container according to the principles of the present teachings.

According to the principles of the present teachings, as illustrated in FIG. 2, a mold design is provided that can comprise an interlocking mating surface. That is, mold device 10 can comprise a pair of mold halves 12, 14 (or additional mold portions) that are movably spaced from one another.

Each of the mold halves 12, 14 can comprise an internal mold contour (not shown) for holding, conforming, or otherwise following a shape of the container to be formed or filled. Mold halves 12, 14 can be positioned together such that a parting line 16 is formed extending along the mating face or surface between mold halves 12, 14. The parting line 16 can include an orifice or aperture 18 for permitting the water or product fill to be introduced or injected into the container (not shown).

As seen in FIG. 2, parting line 16 can comprise an interlocking mating surface system 20 for aligning mold half 12 with mold half 14 in at least a first direction. However, in some embodiments, interlocking mating surface system 20 can align mold halves 12, 14 in at least two dimensions and/or directions. Interlocking mating surface system 20 can comprises a first feature 22 disposed on first mold half 12 and a second feature 24 disposed on second mold half 14. First feature 22 is configured to matingly engage second feature 24 to at least define a mated connection 26 therebetween. This mated connection 26 can serve to define a seal engagement between first mold half 12 and second mold half 14 to in turn define a sealed internal volume 28 within mold device 10. Sealed internal volume 28 can be used to collect and/or contain water or product during a filling operation. In this way, the machinery as a whole can remain uncontaminated, while the internal volume 28 of mold device 10 can be evacuated, drained, or otherwise cleansed.

Figure 3A:
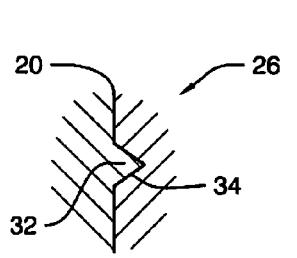
FIG. 3A is a partial cross-sectional view illustrating a mating surface and interlocking mating surface according to some embodiments of the present teachings.
Figure 3B:
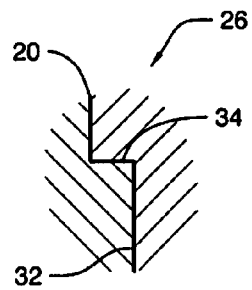
FIG. 3B is a partial cross-sectional view illustrating a mating surface and interlocking mating surface according to some embodiments of the present teachings.

In some embodiments, as illustrated in FIGS. 3A and 3B, interlocking mating surface system 20 can comprise a pair of cooperating features wherein a first protrusion 32 formed on one mold half is received within a complementary sized depression 34 formed on the other mold half. In some embodiments, as illustrated in FIG. 3A, the first protrusion 32 can be triangularly-shaped and the depression 34 can be a similarly-sized triangular shape. It should be appreciated that additional protrusions and complementary sized depressions can be formed along parting line 16. In some embodiments, such as illustrated, the protrusion and depression combinations can be in mirror relationship about parting line 16 to ensure a proper mating connection.

It should be understood that alternative shapes can be used to form the interlocking mating surface system 20, such as offset, generally rectangular sections, as illustrated in FIG. 3B. However, it should be appreciated that additional, non-illustrated, shapes can be used, such as arcuate and any other complementary shape that ensures a proper mating connection. It should also be appreciated that additional members, such as O-rings, can be used to facilitate this mating connection. It should be recognized that other sealing members can be used, such as NSF or other governing body approved material members or food grade sealing material members. Moreover, it should be recognized that any sealing member need not define a hermetic seal in all embodiments.

Figure 4:
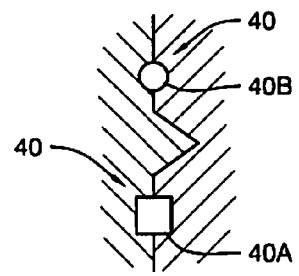
FIG. 4 is a partial cross-sectional view illustrating a mating surface and interlocking mating surface, together with additional channels, according to some embodiments of the present teachings.

With reference to FIG. 4, in some embodiments, mold device 10 can comprise a channel or other relief passage 40 extending along the mating surface system 20 to permit water, solution, or product to be collected and, in some embodiments, drained to a central containment area. In some embodiments, mold device 10 can comprise a series or plurality of channels or passages 40 that can be used to collect and/or evacuate air, water, solution, and/or product either separately or in a multi-stage configuration. That is, in some embodiments, a first channel 40A can be used to permit air to be evacuated during an initial closing of the mold and filling of the container. This air can be routed as necessary. In some embodiments, first channel 40A can be positioned inboard of interlocking mating surface system 20 proximal to the mold cavity. A second channel 40B can be used as a second stage for collecting any air, water, solution, or product that has flown past first channel 40A, interlocking mating surface system 20, and into second channel 40B. In this way, in some embodiments, second channel 40B can be positioned outboard of interlocking mating surface system 20 distal to the mold cavity. It should be appreciated that passage/channel 40, 40A, and 40B can have any one of a number of cross-sectional shapes.

It should be recognized that passage/channel 40 (40A and 40B) can have any one or a number of different profile shapes and contours. For instance, passage/channel 40 can generally define a profile that is ready machined to facilitate automated fabrication thereof. To this end, passage/channel 40 can define a generally smooth profile, such as a U-shaped or C-shaped profile. Passage/channel 40 can be sized to define an area and/or volume of about 5% to 50% (or greater) of the mold cavity area or volume, respectively. In some embodiments, it has been found that passage/channel 40 can define an area or volume of about 20% relative to the area or volume of the mold cavity.

With reference to FIG. 5, in some embodiments, mold device 10 can comprise a collection system 50 for draining or otherwise fluidly communicating fluid from in and around passage 40, 40A, 40B to a central location, such as a drain channel or other conduit 54, via a drainage line 52. It should be understood that drain channel or conduit 54 can include other structure or components (i.e. pumps, basin, trough, etc.) for evacuating fluid collected therein. In some embodiments, drain channel or other conduit 54 can be used to collect fluid or other liquid draining from the mold to prevent contamination of the machine during operation. In some embodiments, drain channel or other conduit 54 can be used to collect fluid used to spray down, wash down, or otherwise sterilize/sanitize the container being formed and/or mold device components. This sterilization/sanitation process can be completed during the molding process or during part of other processing steps. In some embodiments, a sensor 56 can be used to detect a leak or presence or absence of fluid. In this way, sensor 56 can be used to stop a processing step, alert a professional of a potential problem, and/or provide a useful feedback of a processing condition. It should be understood that any one of a number of sensors and sensor types can be used, such as optical, electrical, mechanical, and the like. In some embodiments a sensor could be used in the pressure profile of the fill cylinder. In this regard, if pressure loss is detected, the mold can be opened and the preform and/or defective container can be discarded, the mold can be cleaned, sprayed (steam, hot water, air, etc.), or otherwise reset for further use.

With particular reference to FIG. 7, in some embodiments, cleaning, washing, sterilizing or otherwise addressing any detected spill or collection of fluid can be localized to a region along the manufacturing line that is particularly suited for such cleaning and recovery. That is, in some embodiments, the container of the present teachings can be manufactured using a rotary-style system wherein mold cavities sweep along a circular path as they are both formed and filled, simultaneously, with liquid commodity. If a leak or spill is experienced, collection system 50 can contain the spill and prevent overall contamination of the manufacturing system. In this way, cleaning, washing, sterilizing or otherwise addressing the spill can be handled at a location along the manufacturing line that is equipped to seamlessly and effectively complete the task. As illustrated in FIG. 7, this clean-up zone 100 can be positioned, in some embodiments, at a region located between about 25° and 295°, wherein 0° denotes the start and finish of the rotary-style system where, generally, unformed preforms are inserted into the open mold cavity and completed and filled containers are removed from the mold cavity. By employing the containment system of the present teachings, cleaning, washing, sterilizing, and the like can be located in a centralized location and thus benefits from improved componentry and implementation.

With reference to FIG. 6, in some embodiments, mold device 10 can comprise a blow nozzle mating surface 60 generally surrounding aperture 18. In some embodiments, blow nozzle mating surface 60 can comprise a depression 62 for receiving a tip 64 of the blow nozzle 66 for a secure and positively positioned connection. This provides a positive connection to maintain a reliable fluid seal between nozzle 66 and mold device 10 during filling of the container. It should be appreciated, however, that other selectively interlocking connections can be used. In some embodiments, a drainage line 68 can be fluidly coupled to depression 62 or other portion of blow nozzle mating surface 60 (or annular ring or depression) to collect fluid and transfer the fluid via drainage line 68 to channel or conduit 54. In some embodiments, a channel or conduit that is separate from channel or conduit 54 can be used.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A mold device for injecting a fluid into a container, said mold device comprising:
   a first mold portion having a first mating surface;
   a second mold portion being movable relative to said first mold portion and having a second mating surface, said second mating surface being shaped complementary to said first mating surface for engagement therewith;
   a mold cavity disposed within said first mold portion and said second mold portion;
   an interlocking mating surface system disposed between or made a part of said first mold portion and said second mold portion to align said first mold portion with said second mold portion in at least a first direction;
   a first channel extending adjacent said mold cavity; and
   a second channel outboard of said first channel.

2. The mold device according to claim 1 wherein said interlocking mating surface system is disposed in at least a part of said first mating surface and said second mating surface.

3. The mold device according to claim 1 wherein said interlocking mating surface system aligns said first mold portion with said second mold portion in at least said first direction and a second direction, said second direction being different from said first direction.

4. The mold device according to claim 1 wherein said interlocking mating surface comprises a first feature extending from said first mold portion and a corresponding second feature complementary to said first feature formed in said second mold portion, said first feature being sized to closely conform to said second feature to align said first mold portion and said second mold portion in at least said first direction.

5. The mold device according to claim 4 wherein said first feature is a protrusion and said second feature is a depression.

6. The mold device according to claim 4 wherein said first feature is a triangular protrusion and said second feature is a triangular depression.

7. The mold device according to claim 4 wherein said first feature is a rectangular protrusion and said second feature is a rectangular depression.

8. The mold device according to claim 4 wherein said first feature matingly engages said second feature to define a mated connection.

9. The mold device according to claim 8 wherein said mated connection defines a fluid seal engagement.

10. The mold device according to claim 9 wherein said fluid seal engagement extends about at least a portion of said first mold portion and said second mold portion to define a sealed internal volume for collecting a fluid.

11. The mold device according to claim 1 wherein said interlocking mating surface comprises a first feature extending from said first mold portion and a corresponding second feature complementary to said first feature formed in said second mold portion for mating engagement therewith, said interlocking mating surface further comprising a third feature extending from at least one of said first mold portion and said second mold portion and a corresponding fourth feature complementary to said third feature formed in the other of said first mold portion and said second mold portion for mating engagement therewith.

12. The mold device according to claim 11 wherein said first feature and said second feature are in mirrored relationship with said third feature and said fourth feature.

13. The mold device according to claim 1 wherein said interlocking mating surface comprises an O-ring member for enhanced sealing engagement.

14. The mold device according to claim 1 wherein said first mating surface and said second mating surface define a sealing engagement therebetween.

15. The mold device according to claim 1, further comprising:
   a first channel extending along said first mating surface and said second mating surface, said first channel collecting and fluidly communicating a fluid from said mold cavity to a predetermined location.

16. The mold device according to claim 1 wherein said second channel is disposed outboard of said interlocking mating surface system.

17. The mold device according to claim 1, further comprising:
   a collection channel fluidly coupled to at least one of said first mold portion and said second mold portion to collect fluid.

18. A mold device for injecting a fluid into a container, said mold device comprising:
   a first mold portion having a first mating surface;
   a second mold portion being movable relative to said first mold portion and having a second mating surface, said second mating surface being shaped complementary to said first mating surface for engagement therewith;
   a mold cavity disposed within said first mold portion and said second mold portion;
   an interlocking mating surface system disposed between or made a part of said first mold portion and said second mold portion to align said first mold portion with said second mold portion in at least a first direction and a second direction, said interlocking mating system defining a fluid seal between said first mold portion and said second mold portion;
   a first channel extending adjacent said mold cavity; and
   a second channel outboard of said first channel.

19. The mold device according to claim 18 wherein said interlocking mating surface comprises a first feature extending from said first mold portion and a corresponding second feature complementary to said first feature formed in said second mold portion.

20. The mold device according to claim 1, further comprising:
a sensor fluidly coupled to at least one of said first channel and said second channel, said sensor operable to output a signal upon detection of at least one of presence and absence of the fluid within said at least one of said first channel and said second channel.

21. The mold device according to claim 1, further comprising:
a blow nozzle mating surface generally surrounding an inlet of said mold cavity, said blow nozzle mating surface having a depression; and
a drainage line fluidly coupled to said depression, said drainage line operable to collect and transfer the fluid.

22. A mold device for injecting a liquid commodity into a container, said mold device comprising:
an interlocking mating surface system disposed between or made a part of a first mold portion having a first mating surface and a second mold portion being movable relative to said first mold portion and having a second mating surface, said interlocking mating surface system having a first feature extending from said first mold portion and a corresponding second feature complementary to said first feature formed in said second mold portion, said first feature being sized to closely conform to said second feature to align said first mold portion and said second mold portion in at least a first direction;
a blow nozzle mating surface generally surrounding an inlet of said mold cavity, said blow nozzle mating surface having a depression; and
a drainage line fluidly coupled to said depression, said drainage line operable to collect and transfer the fluid,
wherein said first feature matinqly engages said second feature to define a mated connection, said mated connection defining a liquid commodity seal engagement, said liquid commodity seal engagement defining a sealed internal volume for collecting said liquid commodity.

* * * * *